United States Patent Office 3,301,814
Patented Jan. 31, 1967

3,301,814
PROCESS FOR CURING POLYEPOXIDES WITH SUBSTITUTED PHTHALOCYANINES AND RESULTING PRODUCTS
Harvey L. Parry, Orinda, Calif., assignor to Shell Oil Company, New York, N.Y., a corporation of Delaware
No Drawing. Filed July 19, 1962, Ser. No. 211,129
23 Claims. (Cl. 260—37)

This invention relates to a process for curing polyepoxides. More particularly, the invention relates to a new process for curing polyepoxides with a special class of polynuclear nitrogen-containing curing agents to produce products having improved properties, and to the improved products produced thereby.

Specifically, the invention provides a new process for curing and resinifying polyepoxides, and preferably glycidyl polyethers of polyhydric alcohols or phenols, to produce products having outstanding resistance to high temperatures, which comprises mixing and reacting the polyepoxide with a phthalocyanine compound, and preferably a metal-containing phthalocyanine substituted with functional groups reactive with epoxy groups, such as carboxyl or anhydride groups, such as, for example, copper phthalocyanine octacarboxylic acid. The invention further provides insoluble infusible products having superior heat resistance as produced by the above process.

Polyepoxides, such as those obtained by reacting epichlorohydrin with polyhydric phenols, can be cured with agents, such as amines as diethylene triamine and anhydrides as phthalic anhydride, to form resins which have good adhesion and good chemical resistance. Resins having these properties should be of value in the preparation of laminates and molded articles and in the preparation of adhesives for use in the jet aircraft and rocket industries, and attempts have been made in the past to utilize the polyepoxides in these applications. The results obtained heretofore, however, have not been entirely satisfactory. The polyepoxides cured with the known curing agents, for example, have not shown the hardness and adhesive strengths at elevated temperatures as required for many of these applications.

It is an object of the invention, therefore, to provide a new process for curing polyepoxides. It is a further object to provide a process for curing polyepoxides using a new class of curing agents. It is a further object to provide a new process for curing polyepoxides that gives products having outstanding resistance to heat. It is a further object to provide a new class of curing agents for polyepoxides that are particularly useful for the preparation of adhesives, laminates and molded articles. It is a further object to provide new polyepoxide adhesive compositions which may be used to produce bonding having excellent elevated temperature strengths. It is a further object to provide new adhesive compositions which give bonds which have excellent resistance to chemical and thermal degradation. Other objects and advantages of the invention will be apparent from the following detailed description thereof.

It has now been discovered that these and other objects may be accomplished by the process of the invention which comprises mixing and reacting the polyepoxide with a phthalocyanine compound, and preferably a metal-containing phthalocyanine substituted with functional groups reactive with epoxy groups, such as carboxyl groups and anhydride groups, such as, for example, copper phthalocyanine octacarboxylic acid. It has been found that these particular materials are superior to any of the known curing agents especially in that they give cured products having outstanding resistance to high temperatures and are ideally suited for use in making epoxy resin adhesives for use in the jet aircraft and rocket industries. It has been found, for example, that adhesives prepared from the phthalocyanines, such as, for example, copper phthalocyanine octacarboxylic acid, give bonds with stainless steel which have a tensile shear strength after aging 200 hours at 500° F. of over 2000 p.s.i., while the best adhesive known prior to the present discovery gives a tensile shear strength of only about 1000 p.s.i. under the same conditions. The new products also have excellent resistance to degradation by chemicals and good resistance to water.

The curing agents used according to the present invention comprise the phthalocyanine compounds, i.e., compounds having the nucleus

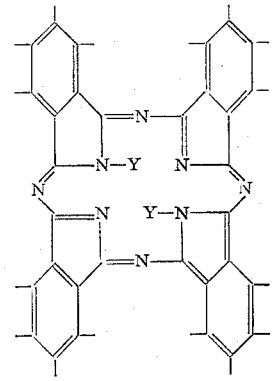

wherein the Y's may be hydrogen or may be replaced by a polyvalent metal which forms a complex union in the center of the molecule. The free bonds on the rings may be joined to inert atoms or radicals or to atoms or radicals which are reactive to epoxy groups.

The free bonds on the rings of the above-described formula may be substituted with a great variety of different substituents. They may be substituted, for example, with hydrogen, —COOH, —COOR, —COOM (wherein M is any monovalent or polyvalent metal), $SO_3H$, $SO_3M$, $SO_3R$, —$CONH_2$, —CONHR

—$CONHNH_2$, —SH, —RSR, —RSSR, —CHO, $$-\overset{O}{\underset{\|}{C}}-R$$

—$CONHRNH_2$, —CN, —RCN, —Cl, —Br, —I, —F, $$-\overset{O}{\underset{\|}{C}}-O-R-OH, \quad -OH, \quad -\overset{O}{\underset{\|}{C}}-O-RCOOH$$

—$NH_2$, $NHRNH_2$ silicon-containing, phosphorous containing radicals, boron-containing radicals, heterocyclic groups, and the like, and two of the bonds may be attached to groups so as to form cyclic structures as

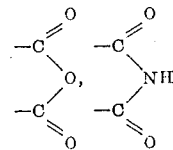

and the like, R in the aforementioned formulae being hydrocarbon or substituted hydrocarbon radicals.

The groups on the free bonds may be the same or different and may be arranged in various symmetrical or unsymmetrical arrangements. Examples include those of the formula

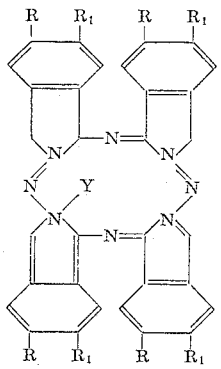

wherein Y is as defined above, R may be COOH, COOR, COOM, $CONH_2$, $CONHNH_2$, —SH, —$NH_2$ and, $R_1$ may be H, COOH, COOR, COOM, $CONH_2$, $CONHNH_2$, —SH, —$NH_2$ and R and $R_1$ may be joined to the same radical to form a cyclic anhydride or imide group.

Preferred phthalocyanine compounds to be employed are those metal-containing phthalocyanines, and particularly those containing a polyvalent heavy metal, such as, for example, copper, cobalt, nickel, magnesium, zinc, chromium, titanium, zirconium, lead, aluminum, iron, and the like. Especially preferred are those containing metals having an atomic number between 20 and 92, and preferably between 20 and 35.

Also preferred are the phthalocyanines and metal-containing phthalocyanines having at least one of the bonds on the rings attached to groups which are reactive with epoxy groups, such as, for example, carboxyl groups, sulfonic acid groups, anhydride groups, amine groups, substituted amine groups, amide groups, imide groups, salt groups, hydrazide groups, mercaptan groups, hydroxyl groups, and the like. The bonds which are not so occupied may be attached to groups which are inert to the epoxy groups, such as, for example, hydrogen, halogen, hydrocarbon radicals, alkoxy radicals, ester radicals, and the like.

The location of the above-noted groups on the phthalocyanine rings is not particularly important as all portions are effective. In most cases, the groups will be symmetrically arranged on the various rings as a result of the hereinafter described preparation procedures. For simplicity in nomenclature throughout the specification, the compounds are described as octacarboxylic acid or tetracarboxylic acid and the like. Unless otherwise indicated, this should be taken to mean that the groups are symmetrically placed on the rings, thus an octa-carboxylic acid means the presence of two carboxyl groups on each of the four rings, and a tetracarboxylic acid means the presence of one carboxyl group on each of the four rings.

Examples of the preferred phthalocyanines and metal-containing phthalocyanines include, among others, copper phthalocyanine octacarboxylic acid, copper phthalocyanine tetracarboxylic acid, copper phthalocyanine tetraanhydride, copper phthalocyanine octamine, copper phthalocyanine tetramercaptan, copper phthalocyanine tetrahydroxy tetracarboxylic acid, nickel phthalocyanine tetracarboxylic acid, cobalt phthalocyanine octacarboxylic acid, nickel phthalocyanine tetrasulfonic acid, cobalt phthalocyanine octasulfonic acid, cobalt phthalocyanine hydrazide, chromium phthalocyanine tetramide, cobalt phthalocyanine tetrahydrazide, aluminum phthalocyanine octacarboxylic acid, cobalt phthalocyanine tetraimide, titanium phthalocyanine tetracarboxylic acid, cobalt phthalocyanine tetrachloro tetracarboxylic acid, copper phthalocyanine tetraethoxy tetracarboxylic acid, copper phthalocyanine tetracarboethoxy tetramercaptan, zirconium phthalocyanine octacarboxylic acid, nickel phthalocyanine tetrabromo tetramercaptan, copper phthalocyanine tetraallyl tetracarboxylic acid, and copper phthalocyanine octamine hydrochloride salt.

The phthalocyanine materials employed may also be of the polymeric type which will contain two or more of the phthalocyanine groups as described above joined through chemical bonding. For example, polymeric phthalocyanines are obtained by reacting the polycarboxylic acid substituted phthalocyanines with polyhydric alcohols, or polyhydroxy-substituted phthalocyanines with polycarboxylic acids. The polycarboxylic acid substituted phthalocyanines may be reacted with polyamines to form polyamides or the polyamino-substituted phthalocyanines may be reacted with polycarboxylic acids to form usable polyamides. Those phthalocyanines substituted with ethylenic groups, such as, for example, the allylic-substituted phthalocyanines, may be polymerized with the double bonds with free radical yielding catalysts to form polymeric-type curing agents.

Examples of the above-described polymeric phthalocyanines include, among others, the polyester obtained by reacting copper phthalocyanine octacarboxylic acid with ethylene glycol, the polyester obtained by reacting nickel phthalocyanine tetracarboxylic acid with glycerol, the polyester obtained by reacting copper phthalocyanine tetracarboxylic acid with propylene glycol, the polyamide formed by reacting copper phthalocyanine tetracarboxylic acid with ethylene diamine, the polyamide formed by reacting copper phthalocyanine tetramine with adipic acid, the polyamide formed by reacting nickel phthalocyanine tetramine with phthalic acid, and the polymer formed by polymerizing copper phthalocyanine tetrallyl tetracarboxylic acid amide.

Other examples include the phthalocyanine polymers wherein one or more of the rings in the phthalocyanine unit becomes a part of another phthalocyanine unit

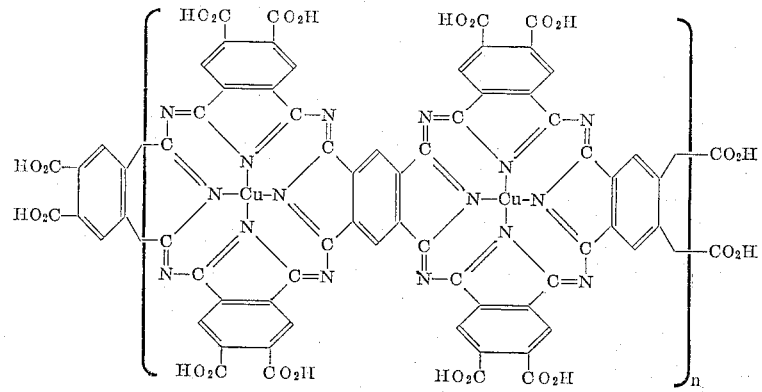

wherein $n$ is an integer selected from 1 to 3. Examples of such polymers and their preparation are given in J. Am. Chem. Soc. 81, page 4795 (1959).

The phthalocyanine compounds described above can be prepared by a variety of different techniques. It is well known that metal phthalocyanines can be prepared by heating together aromatic anhydrides, urea, and a salt of the metal to a temperature of the order of about 180° C. to 250° C. By leaving out the metal salt, metal free phthalocyanines can be prepared. Catalysts, such as ammonium molybdate, may be used to speed the reaction. The substituted derivatives may be obtained by the use of substituted aromatic anhydrides in the reaction. For example, to obtain the octacarboxylic acid derivative one uses pyromellitic dianhydride in place of the phthalic anhydride. To obtain the tetracarboxylic derivative, one employs trimellitic anhydride instead of phthalic anhydride. Amino derivative may be obtained by using amino-substituted phthalic anhydride.

The above preparation is generally carried out by the hot melt technique, but it is preferred in some cases to utilize high boiling solvents, such as decalin, naphthalene, quinoline, etc. It has been found that particularly superior results are obtained by heating the above-noted reactants in the presence of an excess of sulfolane at temperatures say from 200° to 240° C.

The phthalocyanine materials, which are in general insoluble solids, may be purified by any of the known techniques, such as precipitation in water, solvents, filtration and the like.

Typical examples of some of the preparations of the phthalocyanines are given below:

PREPARATION OF COPPER PHTHALOCYANINE OCTACARBOXYLIC ACID BY FUSION 80 g. (1.33 moles) of urea was melted in a 1000 cc. flask to which was added 34.5 g. (0.16 moles) pyromellitic dianhydride, then 4 g. (0.04 moles) CuCl. This was heated over an open flame while stirring with a thermometer. At 190–200° C. the material turned to a reddish-brown fluid. 0.1 gram of ammonium molybdate was added and heating continued. At 220° C. the material began to turn green, and the color rapidly intensified until it was almost black. After one minute at 220° C., the material was a thick, grainy paste which was scraped and poured out on to aluminum foil. After cooling, the cake was broken up, boiled with 200 cc. distilled water, filtered and washed with an additional 200 cc. boiling distilled water. The crude product weighed 39.9 g. (83% yield based on PMDA). This product was dried 8 hours at 200° F., then ground and repeatedly washed with boiling water. It was finally redried and dissolved in 350. g. concentrated $H_2SO_4$, then reprecipitated by pouring into 2 l. of water. The precipitate was washed with water until the washings were neutral. The dried product weighed 29 g. (60% yield). Analysis was: C=48.6%, H=2.3%, O=26.2%, N=15.7%, Cu=7.2%. This acid can be referred to as copper phthalocyanine 4,5:4',5':4'',5'':4''',5''' octacarboxylic acid.

PREPARATION OF COPPER PHTHALOCYANINE TETRAANHYDRIDE

The tetraanhydride is prepared from the above-described copper phthalocyanine octacarboxylic acid by heating the product to 260° C. The resulting copper phthalocyanine tetraanhydride is also a greenish insoluble solid.

PREPARATION OF COPPER PHTHALOCYANINE OCTACARBOXYLIC ACID BY SOLVENT TECHNIQUE

To a two-necked 500 cc. boiling flask equipped with Teflon stirrer, heating mantle, and thermometer, was added 21.8 g. (0.1 mole) of pyromellitic dianhydride, 24 g. (0.4 mole) of urea, 2.5 g. (.025 mole) of CuCl, .1 g. of ammonium molybdate, and 150 g. of sulfolane. The mixture was heated and stirred. At 208° C. a green color was noted which rapidly increased in intensity. Heating and stirring were continued for 13 more minutes, during which time the temperature rose to 229° C. The reaction mixture was allowed to cool for a few minutes and then poured into an excess of water. The product was filtered off, washed several times with boiling water and dried at 250° F. Yield was 22 g. (73%). Analysis was: C=50.7%, H=2.2%, O=24.4% (by diff.), N=16.4%, Cu=6.3%.

PREPARATION OF COPPER PHTHALOCYANINE TETRACARBOXYLIC ACID

To a 150 cc. beaker was added 1.9 g. of trimellitic anhydride (.01 mole), 2.4 g. of urea (.04 mole), 0.25 g. of CuCl (.0025 mole), .1 gram of ammonium molybdate, and 15 g. of sulfolane. The mixture was heated over an open flame while stirring with a thermometer. A copious green precipitate was obtained starting at 230° C. Heating was continued on up to 250° C. while the reaction mixture got thicker as more solid precipitated. The reaction mixture was poured into an excess of water, filtered, and the cake washed several times with boiling water. The material was dried at 250° F. Analysis was: O=15.0%, Cu=7.7%. This may be referred to as copper phthalocyanine 4:4':4'':4''' tetracarboxylic acid.

PREPARATION OF METAL-FREE PHTHALOCYANINE OCTACARBOXYLIC ACID

The above-noted preparation technique for copper phthalocyanine octacarboxylic acid was repeated with the exception that the copper chloride was eliminated. The resulting crystals obtained in 63% yield were identified as the metal-free phthalocyanine octacarboxylic acid. Analysis: N=16.2%, O=28.9%, Cu-none, acidity 5.1 meg/gram.

PREPARATION OF METAL-FREE PHTHALOCYANINE TETRACARBOXYLIC ACID

The above-noted preparation technique for copper phthalocyanine tetracarboxylic acid was repeated with the exception that the copper chloride was eliminated. The resulting crystals obtained in 55% yield were identified as the metal-free phthalocyanine tetracarboxylic acid. Analysis: N=24.6%, O=16.9%, Cu-none, acidity 2.7 meg/gram.

The use of longer reaction times and higher temperatures tend to give the polymeric type phthalocyanines as described hereinabove in large amounts as compared to the monomeric phthalocyanines.

The polyepoxides to be used in preparing the compositions of the present invention comprise those materials possessing more than one vicinal epoxy group, i.e., more than one

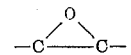

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. 2,633,458. The polyepoxides used in the present process are those having an epoxy equivalency greater than 1.0

Various examples of polyepoxides that may be used in the process of the invention are given in U.S. 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower rapeseed, hempseed, sardine, cottonseed oil, and the like.

Another group of the epoxy-containing materials used in the process of the invention include the epoxidized esters of unsaturated monohydric alcohols and polycarboxylic acids, such as, for example, di(2,3-epoxybutyl) adipate, di(2,3-epoxybutyl) oxalate, di(2,3-epoxyhexyl) succinate, di(3,4-epoxybutyl) maleate, di(2,3-epoxyoctyl) pimelate, di(2,3-epoxybutyl) phthalate, di(2,3-epoxyoctyl) tetrahydrophthalate, di(4,5-epoxydodecyl) maleate, di(2,3-epoxybutyl) terephthalate, di(2,3-epoxypentyl) thiodipropionate, di(5,6-epoxytetradecyl) diphenyldicarboxylate, di(3,4-epoxyheptyl) sulfonyldibutyrate, tri(2,3-epoxybutyl) 1,2,4-butanetricarboxylate, di(5,6-epoxypentadecyl) tartarate, di(4,5-epoxytetradecyl) maleate, di(2,3-epoxybutyl) azelate, di(3,4-epoxybutyl) citrate, di(5,6-epoxyoctyl) cyclohexane-1,2-dicarboxylate, di(4,5-epoxyoctadecyl) malonate.

Another group of the epoxy-containing materials includes those epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-epoxycyclohexanoate, 3,4-epoxycyclohexyl 4,5-epoxyoctanoate, 2,3-epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11-diepoxyhexadecanedioate, didecyl 9-epoxy-ethyl-10,11-epoxyoctadecanedioate, dibutyl 3 - butyl - 3,4,5,6 - diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosanedienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl) propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl containing nitrogen compounds, such as diglycidyl aniline and di- and triglycidylamine.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and Polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl) pentane (epoxy value of 0.514 eq./100 g.) and the like and mixtures thereof.

The quantities in which the polyepoxides and phthalocyanine compounds are combined will vary over a wide range. To obtain the best cure, the phthalocyanine is preferably employed in amounts varying from about 1% to 75% by weight of the polyepoxide, and still more preferably from 10% to 60% by weight of the polyepoxide. If the phthalocyanine contains groups known to react with epoxy groups the compound may be employed in about at least a chemical equivalent amount, i.e., in an amount sufficient to furnish one carboxylic anhydride group, i.e., a

group, for every epoxide group in the polyepoxide. Still more preferably, such phthalocyanines and polyepoxides are combined in chemical equivalent ratios varying from about .5:1 to 1.5:1, and generally between .8:1 and 1:1.

It is preferred in some cases to employ activators for the cure. Examples of these include, among others, phenols, mercaptans, triphenyl phosphorous, triphenyl arsenic, triphenyl antimony, amines, amine salts or quaternary ammonium salts, etc. Preferred activators are the mercaptans, phenols, triphenyl phosphorous and the amines, such as, for example, benzyldimethylamine dicyandiamide p,p' - bis(dimethylaminophenyl) methane, pyridine, dimethyl aniline, benzyldimethylamine dimethylethanolamine, methyldiethanolamine, morpholine, dimethylaminopropylamine, dibutylaminopropylamine, stearyldimethylamine, tri-n-butyl amine, N,N-dibutyl butylamine, tri-n-hexylamine, ethyl di-n-propylamine, phenylene diamine, diethylene triamine and the like, and mixtures thereof. The salts may be exemplified by the inorganic and organic acid salts of the amines, such as, for example, the hydrochloride, sulfate and acetate of each of the above-described tertiary amines. The quaternary ammonium salts may be exemplified by the following: benzyltrimethylammonium chloride, phenyltributylammonium chloride, cyclohexyltributylammonium sulfate, benzyltrimethylammonium sulfate, benzyltrimethylammonium borate, diphenyldioctylammonium chloride, and the like, and mixtures thereof.

Preferred activators to be used are the triphenyl substituted metals of Group V of the Med. Periodic Table of Elements, hydrocarbon tertiary amines, and more preferably the mono- and diamines wherein the amine hydrogens have been replaced by aliphatic, cycloaliphatic or aromatic hydrocarbon radicals containing not more than 15 carbon atoms, such as, for example, the trialkyl amines, triaryl amines, triarylalkylamines, alkyl-arylalkylamines, tricycloalkylamines, alkyl dicycloalkylamines, diaminoalkanes, dialkylene triamines, phenylene diamines and di(aminoaryl) alkanes. Preferred amine salts are the hydrochloride, sulfate and acetate of the above-described preferred amines. The preferred quaternary salts are those of the formula

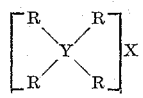

wherein Y is nitrogen, R is an alkyl, aryl or arylalkyl radical, preferably containing no more than 12 carbon atoms and X is chlorine.

The activators noted above are generally employed in amounts varying from 0.1 part to 4 parts per 100 parts of polyepoxide, and preferably from 1 part to 3 parts per 100 parts of polyepoxide.

It is also possible to use the above-described phthalocyanines in admixtures with other curing agents, such as, for example, phthalic anhydride, tetrahydrophthalic anhydride, methylnadic anhydride, chlorendic anhydride, pyromellitic dianhydride, and the like, or other epoxy curing agents, such as amines, salts and acids. Preferably up to 70% and still more preferably from 1% to 60% of the above-described phthalocyanines can be replaced by these other curing agents.

The curing of the polyepoxides may be accomplished by merely mixing the polyepoxides with the phthalocyanines and heating the combined mixture. As many of the phthalocyanines are solids which in some cases have limited solubility in the polyepoxides, the mixing may be accomplished by dispersing the solid phthalocyanines in the polyepoxides by milling. In other cases, the components may be combined by use of common solvents. Suitable common solvents in some instances include the dimethyl formamide, dimethylacetamide and the like.

The temperatures employed during the cure may vary over a wide range. In general, temperatures ranging from about 50° C. to 300° C. will give satisfactory results. Preferred temperatures range from about 150° C. to 250° C. With the higher temperatures, curing generally takes place with about 30 minutes to several hours.

The resinified products obtained by the above-described process have surprisingly high hot hardness and strength values at elevated temperatures. In addition, they display excellent resistance to boiling water and powerful solvents and chemicals. These unusual properties make the process of particular value in the preparation of adhesives, laminates and molded articles.

The new compositions of the invention are particularly outstanding as adhesives. In this application they can be used as a paste or solution depending on the method of preparation as described above. Other materials may also be included in the composition, such as pigments, plasticizers, stabilizers and reinforcing fillers, such as aluminum powder, asbestos, powdered mica, zinc dust, bentonite, ground glass fibers, Monetta clay and the like. These fillers are preferably used in amounts varying from about 10 parts to 200 parts per 100 parts of the polyepoxide and phthalocyanine compound. Other materials that may be included include other types of resins, such as phenol-aldehyde resins, urea-aldehyde resins, furfural resins, polyacetal resins, carbonate resins, polyamide resins, and the like.

The compositions may be used in the bonding of a great variety of different materials, such as metal-to-metal to other materials, such as plastic, wood-to-wood, glass-to-glass, glass-to-metal, and the like. They are of particular value, however, in the bonding of metals such as aluminum-to-aluminum and steel-to-steel. When applied as an adhesive, the compositions may simply be spread on the desired surface to form films of various thicknesses, e.g., 0.5 mil to 30 mils, and then the other surface superimposed and heat applied. Curing pressures can be light contact pressures up to about 500 p.s.i.

When the compositions are used as adhesives for metal-to-metal bonding, it has sometimes been found advantageous to impregnate cotton, rayon, synthetic fiber or glass cloth textiles with the compositions, and then use the impregnated textiles as a bonding tape for joining the metals. Such tapes provide convenient means for handling and using the compositions in adhesive applications. The tape is inserted between two metals desired to be joined, and the assembly is heated and baked to cure the resin whereby articles are obtained wherein the joined surfaces have not only excellent strength at ordinary temperatures, but also retain good strength even though heated at quite elevated temperature for long periods of time. A preferred tape for such use comprises a glass fiber textile impregnated or coated with a mixture of the polyepoxide, phthalocyanine compound and atomized aluminum powder or dust.

The new compositions are also useful for preparing laminates. In preparing the laminate, the sheets of fibrous material are first treated with the mixture of polyepoxide and phthalocyanine. This is conveniently accomplished by spreading the paste or solution containing the above-noted mixture onto the sheets of glass cloth, paper, textiles, etc. The sheets are then superimposed and the assembly cured under heat and pressure. The assembly is preferably cured in a heated press under a pressure of about 25 to 500 or more pounds per square inch and temperatures of about 100° C. to 300° C. The resulting laminate is extremely strong and resistant against heat and the action of organic and corrosive solvents.

The fibrous material used in the preparation of the laminates may be of any suitable material, such as glass cloth and matting, paper, asbestos paper, mica flakes, cotton bats, duck muslin, canvas and the like. It is usually preferred to utilize woven glass cloth that has been given prior treatment with well known finishing or sizing agents, therefor, such as chrome methacrylate or vinyl trichlorosilane.

When using the above-noted curing agents to prepare molded articles, it is generally preferred to first prepare a molding powder by milling together a mixture of the polyepoxide, phthalocyanine and customary fillers and mold release agents. If desired, the milled mixture may be prepared in preformed pellets and the like. The powders are then used in conventional methods for preparation of plastic products.

The above-described phthalocyanine compounds have also been found to be outstanding curing agents for other materials, such as polyamines, glycols, polyurethanes, polyamides, and the like. The reaction of the phthalocyanine anhydrides with an excess of amines such as triethylene tetramine results in products which set up at 300° F. to form hard tough but flexible thermosetting materials. Products obtained by such reactions will be covered in separate patent applications.

To illustrate the manner in which the invention may be carried out, the following examples are given. It is to be understood, however, that the examples are for the purpose of illustration and invention is not to be regarded as limited to any of the specific materials or conditions recited therein. Polyepoxides referred to by letter are those described in U.S. 2,633,458.

Example 1

This example illustrates the superior results obtained by using copper phthalocyanine octacarboxylic acid as curing agent for a polyepoxide.

100 parts of a glycidyl ether of a phenol-formaldehyde condensate having about 2.5 epoxy groups per mol was mixed with 50 parts of copper phthalocyanine octacarboxylic acid prepared as noted above. The mixing was accomplished by milling the components together on a three roll paint mill. The resulting pastes were used as an adhesive for the bonding of stainless steel panels (cleaned by 15 minutes immersion in concentrated hydrochloric acid) and conventional lap shear adhesive specimens assembled using small spring clamps to hold the pieces together during cure. Curing took place after about 45 minutes at 500° F.

The results as to tensile shear strength at elevated temperatures are shown in the table below:

| Aging | | Testing | |
|---|---|---|---|
| Hours | Temp., °F. | Temp., °F. | P.s.i. |
| 98 | 500 | 500 | 1,920 |
| 210 | 500 | 500 | 1,720 |
| 103 | 500 | | |
| +11 | 600 | 600 | 1,600 |
| Best adhesive known to date | | | |
| 192 | 500 | 500 | 1,000 |
| No aging | | 600 | 500 |

*Example II*

100 parts of the glycidyl ether of a phenol-aldehyde condensate defined in Example I was combined with 50 parts of copper phthalocyanine octacarboxylic acid prepared as shown above and 1.5 parts of triphenylphosphorous. The mixture was accomplished by milling the components together as in Example I. The resulting pastes were used as an adhesive for bonding of stainless steel panels and conventional lap shear adhesive specimens assembled using small spring clamps to hold the pieces together during cure. Curing was accomplished at 500° F. in a forced draft oven. Curing took place in about 45 minutes at 450° F.

The results as to tensile shear strength after aging at elevated temperatures are shown in the table below:

| Aging | | Testing | |
|---|---|---|---|
| Hours | Temp., °F. | Temp., °F. | P.s.i. |
| 98 | 500 | 500 | 2,500 |
| 210 | 500 | 500 | 2,050 |
| 103 | 500 | | |
| +11 | 600 | 600 | 1,650 |

*Example III*

Example I was repeated with the exception that the copper phthalocyanine octacarboxylic acid was replaced with copper phthalocyanine. The resulting adhesive bond after aging 90 hours at 500° F. and tested at 500° F. had a tensile shear strength of 1110 p.s.i.

*Example IV*

100 parts of a gylycidyl ether of 2,2-bis(4-hydroxyphenyl) propane having an epoxy value of about 0.52 eq./100 g. was combined with 100 parts of copper phthalocyanine tetracarboxylic acid prepared as shown above. The mixing was accomplished by milling the components together on a three roll paint mill. The resulting paste cured on a 500° F. hot plate in 45 minutes to a product which was hard and tough at 500° F.

*Example V*

100 parts of the glycidyl ether of a phenol-aldehyde condensate defined in Example I was combined with 50 parts of metal-free phthalocyanine octacarboxylic acid prepared as noted above. The mixture was combined with some dimethylformamide to form a paste and used as an adhesive for the bonding of stainless steel as in Example I. The resulting bonds were very strong and had good resistance to elevated temperatures.

*Example VI*

100 parts of the glycidyl ether of a phenol-aldehyde condensate defined in Example I was combined with 50 parts of a metal-free phthalocyanine polycarboxylic acid prepared by reaction of urea with a mixture of 218 parts pyromellitic diahydride and 148 parts phthalic anhydride. The mixture was combined with some dimethylformamide to form a paste and used as an adhesive for the bonding of stainless steel as in Example I. The resulting bonds were very strong and had good resistance to elevated temperatures.

*Example VII*

100 parts of a glycidyl polyether of 2,2-bis(4-hydroxyphenyl) propane having an epoxy eq./ of 0.52 eq./100 g. was combined with 60 parts of a polymeric material formed by reacting an ethylene glycol adduct of pyromellitic anhydride with urea under the reaction conditions noted for the preparation of the copper phthalocyanine octacarboxylic acids noted above. The paste was used for the bonding of stainless steel panels and the panels were cured at 450° F. for several hours. The resulting bonds had good strength at elevated temperatures.

*Example VIII*

Examples I and II are repeated with the exception that the curing agent is cobalt phthalocyanine octacarboxylic acid prepared from urea, pyromellitic dianhydride and cobalt chloride. Related results are obtained.

*Example IX*

Examples I to VII are repeated with the exception that the polyepoxide is a glycidyl ether of glycerol. Related results are obtained.

*Example X*

A polymeric copper phthalocyanine prepared as shown in J. Am. Chem. Soc. 81, 4795 is used as a curing agent for the glycidyl polyether in Example I by the procedure of Example I. Related results are obtained.

*Example XI*

Example I is repeated with the exception that the curing agent is copper phthalocyanine 4:4':4'':4''' tetrasulfonic acid. Related results are obtained.

*Example XII*

Examples I and II are repeated with the exception that the curing agent is as follows: nickel phthalocyanine, iron phthalocyanine 4:4':4'':4''' tetracarboxylic acid, molybdenum phthalocyanine 5:5':5'':5''' tetracarboxylic acid, aluminum phthalocyanine 4,5:4',5':4'',5'':4''',5''' octacarboxylic acid and zinc phthalocyanine 4,5:4',5':4'',5'':4''',5''' tetraanhydride.

*Example XIII*

Example I is repeated with the exception that the curing agent is copper phthalocyanine 2,4:2',4':2'',4'':2''',4''' octaamine. Related results are obtained.

*Example XIV*

Example I is repeated with the exception that the curing agent is a sulfate salt of copper phthalocyanine 4,5:4',5':4'',5'':4''',5''' octaamine. Related results are obtained.

*Example XV*

Examples I and II are repeated with the exception that the curing agent is as follows: nickel phthalocyanine 4:4',:4'':4''' tetrahydrazide, copper phthalocyanine 2:2':2'':2''' tetracarboethoxy 4:4':4'':4''' tetramercaptan, nickel phthalocyanine and copper phthalocyanine 3:3':3":3''' tetramethanol tetrabromo tetramercaptan. Related results are obtainable.

*Example XVI*

Examples I to X are repeated with the exception that the polyepoxide is an epoxidized methylcyclohexenylmethyl methylcycolohexenecarboxylate, a mixture of epoxidized polyester of butenediol and phthalic anhydride with glycidyl ether, and epoxidized dimethylallyl phthalate. Related results are obtained.

I claim as my invention:

1. A process for converting a polyepoxide having more than one vic-epoxy group to an insoluble infusible product having good heat resistance which comprises mixing and reacting the polyepoxide with from 1% to 75% by weight of the polyepoxide of a phthalocyanine compound of the structure

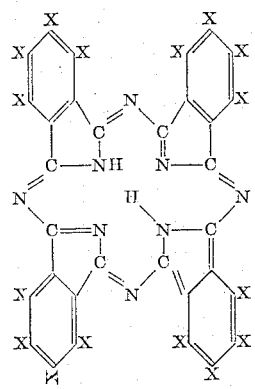

wherein at least four X's are reactive groups selected from the group consisting of carboxylic acid, acid anhydride, hydrazine, mercaptan, amine, sulfonic acid and amine sulfate groups and the remaining X's are selected from the group consisting of hydrogen, hydrocarbon radicals, halogen atoms, alkoxy radicals and ester radicals.

2. A process for converting a polyepoxide having more than one vic-epoxy group to an insoluble infusible product having good heat resistance which comprises mixing and reacting the polyepoxide with from 1% to 75% by weight of the polyepoxide of a phthalocyanine compound of the structure

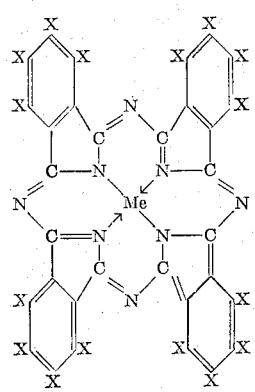

wherein Me is a polyvalent heavy metal and at least four X's are reactive groups selected from the group consisting of carboxylic acid, acid anhydride, hydrazine, mercaptan, amine, sulfonic acid and amine sulfate groups and the remaining X's are selected from the group consisting of hydrogen, hydrocarbon radicals, halogen atoms, alkoxy radicals and ester radicals.

3. A process as in claim 2 wherein the polyepoxide is a glycidyl polyether of a polyhydric phenol having a 1,2-epoxy equivalency greater than 1.0 and a molecular weight between 200 and 900.

4. A process as in claim 2 wherein the polyepoxide is an aliphatic liquid polyepoxide having a 1,2-epoxy equivalency between 1.0 and 2.0.

5. A process as in claim 2 wherein at least one of the X's on each ring is a carboxyl group.

6. A process as in claim 2 wherein two of the X's on each of the four outer rings have been combined together to form an anhydride group.

7. A process as in claim 2 wherein at least one X is a —NH$_2$ group.

8. A process for converting a polyepoxide having more than one vic-epoxy group to an insoluble infusible product having good heat resistance which comprises heating a mixture of the polyepoxide containing from 1% to 75% by weight of the polyepoxide of a phthalocyanine compound of the structure

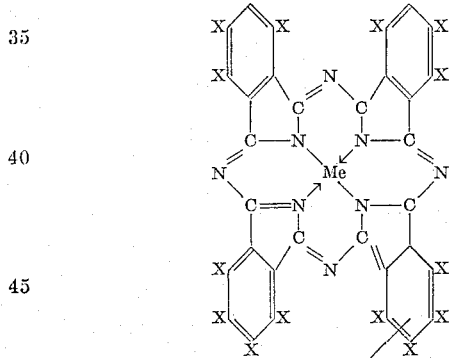

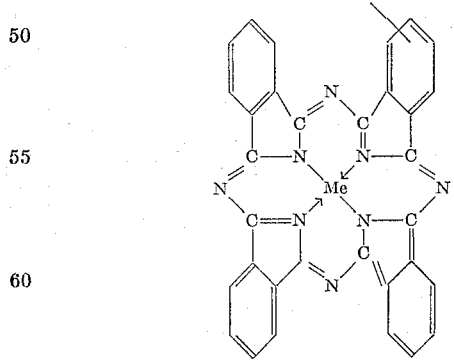

wherein Me is a polyvalent metal, at least four X's are reactive groups selected from the group consisting of carboxylic acid, acid anhydride, hydrazine, mercaptan, amine, sulfonic acid and amine sulfate groups and the remaining X's are selected from the group consisting of hydrogen, hydrocarbon radicals, halogen atoms, alkoxy radicals and ester groups, and R is an organic bivalent radical.

9. A process for curing polyepoxides containing more than one vic-epoxy group which comprises mixing and reacting the polyepoxide with a curing agent consisting essentially of from 1% to 75% by weight of the polyepoxide of copper phthalocyanine octacarboxylic acid.

10. A process for curing polyepoxides containing more than one vic-epoxy group which comprises mixing and reacting the polyepoxide with a curing agent consisting essentially of from 1% to 75% by weight of the polyepoxide of copper phthalocyanine tetracarboxylic acid anhydride.

11. A process for curing polyepoxides containing more than one vic-epoxy group which comprises mixing and reacting the polyepoxide with a curing agent consisting essentially of from 1% to 75% by weight of the polyepoxide of copper phthalocyanine tetracarboxylic acid.

12. A process for curing polyepoxides containing more than one vic-epoxy group which comprises mixing and reacting the polyepoxide with a curing agent consisting essentially of from 1% to 75% by weight of the polyepoxide of copper phthalocyanine tetrasulfonic acid.

13. A composition comprising a polyepoxide possessing more than one vic-epoxy group and a curing agent consisting essentially of from 1% to 100% by weight of the polyepoxide of a phthalocyanine compound of the structure

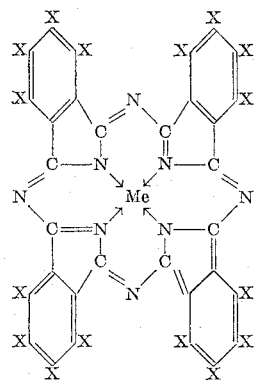

wherein at least four X's are reactive groups selected from the group consisting of carboxylic acid, acid anhydride, hydrazine, mercaptan, amine, sulfonic acid and amine sulfate groups and the remaining X's are selected from the group consisting of hydrogen, hydrocarbon radicals, halogen atoms, alkoxy radicals and ester radicals, and Me is a polyvalent heavy metal.

14. A composition comprising a polyglycidyl ether of a polyhydric compound having more than one vic-epoxy group selected from the group consisting of polyhydric alcohols and polyhydric phenols and a curing agent consisting essentially of 1% to 75% by weight of the glycidyl ether of copper phthalocyanine octacarboxylic acid.

15. An adhesive composition comprising a polyepoxide possessing more than one vic-epoxy group, a filler and a curing agent consisting essentially of 1% to 75% by weight of polyepoxide of a phthalocyanine compound as defined in claim 13.

16. An adhesive composition comprising a glycidyl polyether of a polyhydric phenol having more than one vic-epoxy group, an inert filler and a curing agent consisting essentially of 1% to 75% by weight of glycidyl polyether of a metal-containing phthalocyanine substituted with at least four carboxyl groups.

17. An adhesive composition comprising a glycidyl polyether selected from a polyhydric compound having more than one vic-epoxy group of the group consisting of polyhydric alcohols and polyhydric phenols and a curing agent consisting essentially of 1% to 75% by weight of the glycidyl polyether of copper phthalocyanine octacarboxylic acid.

18. A composition comprising a polyepoxide having more than one vic-epoxy group and a curing agent consisting essentially of from 1% to 75% by weight of polyepoxide of a phthalocyanine of the formula

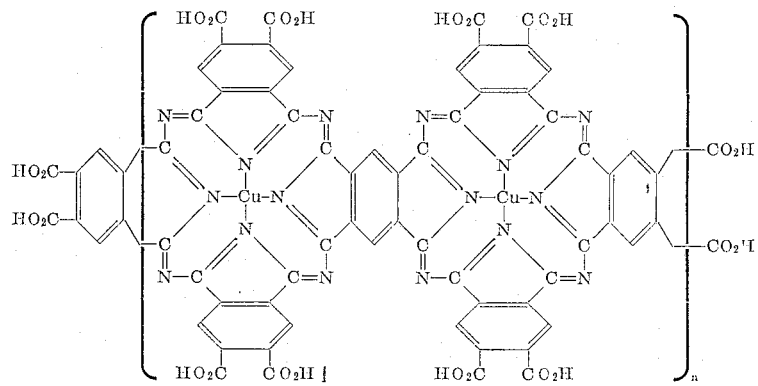

wherein $n$ is 1 to 3.

19. A process for converting a glycidyl polyether of a polyhydric phenol having an epoxy equivalence greater than 1.0 to an insoluble, infusible product having good heat resistance which comprises mixing and reacting the polyether with a curing agent consisting essentially of copper phthalocyanine octacarboxylic acid, said curing agent and glycidyl polyether being used in a chemical equivalent ratio varying from 0.5:1 to 1.5:1.

20. An adhesive composition comprising a glycidyl polyether of a polyhydric phenol having an epoxy equivalence greater than 1.0 and a curing agent consisting essentially of from 1% to 75% by weight of glycidyl polyether of copper phthalocyanine octacarboxylic acid.

21. A process for producing a resinified product having good heat resistance which comprises mixing and reacting a polyepoxide having more than one vic-epoxy group with curing agent consisting of a phthalocyanine compound having the four outer rings substituted with at least four reactive groups selected from the group consisting of carboxylic acid, acid anhydride, hydrazine, mercaptan, amine, sulfonic acid and amine sulfate groups, the curing agent and polyepoxide being combined in a chemical equivalent ratio varying from 0.5:1 to 1.5:1.

22. A composition comprising a polyepoxide possessing more than one vic-epoxy group and a curing agent consisting of a phthalocyanine compound having the four outer rings substituted with at least four reactive groups selected from the group consisting of carboxylic acid, acid anhydride, hydrazine, mercaptan, amine, sulfonic acid and amine sulfate groups, the curing agent and polyepoxide being combined in a chemical equivalent ratio varying from 0.5:1 to 1.5:1.

23. A process comprising mixing and reacting a polyepoxide having more than one vic-epoxy group with from 1% to 75% by weight of the polyepoxide of nickel phthalocyanine octacarboxylic acid.

References Cited by the Examiner

UNITED STATES PATENTS

| | | | |
|---|---|---|---|
| 2,213,726 | 9/1940 | Blackley | 260—614.5 |
| 2,819,208 | 3/1959 | Smith et al. | 260—837 |
| 2,876,208 | 3/1959 | Naps | 161—186 |
| 2,951,778 | 9/1960 | Haberlin | 161—186 |
| 2,999,832 | 9/1961 | Faerber | 260—37 |
| 3,009,920 | 11/1961 | Jaeger et al. | 260—314.5 |
| 3,028,392 | 4/1962 | Dudnikov | 260—314.5 |

OTHER REFERENCES

Cook: J. Chem. Soc. (London), 1938, page 1763, 260—314.5.

A. E. Martell and M. Calvin: "Chemistry of the Metal Chelate Compounds," Prentice Hall, Inc. N.Y. (1952), pages 277, 278 and 324.

MORRIS LIEBMAN, *Primary Examiner.*

JOSEPH L. SCHOFER, *Examiner.*

J. E. CALLAGHAN, T. D. KERWIN,
*Assistant Examiners.*